(12) United States Patent
Du

(10) Patent No.: US 9,392,190 B2
(45) Date of Patent: Jul. 12, 2016

(54) METHOD AND DEVICE FOR ACQUIRING IMAGE

(71) Applicants: BEIJING LENOVO SOFTWARE LTD., Beijing (CN); LENOVO (BEIJING) CO., LTD., Beijing (CN)

(72) Inventor: Yaojiang Du, Beijing (CN)

(73) Assignees: BEIJING LENOVO SOFTWARE LTD., Beijing (CN); LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 14/064,030

(22) Filed: Oct. 25, 2013

(65) Prior Publication Data

US 2014/0118576 A1    May 1, 2014

(30) Foreign Application Priority Data

Oct. 30, 2012  (CN) .......................... 2012 1 0425212

(51) Int. Cl.
*H04N 5/262* (2006.01)
*H04N 5/232* (2006.01)
*H04N 5/272* (2006.01)

(52) U.S. Cl.
CPC ......... *H04N 5/2621* (2013.01); *H04N 5/23212* (2013.01); *H04N 5/272* (2013.01)

(58) Field of Classification Search
CPC .. H04N 5/2621; H04N 5/272; H04N 5/23212
See application file for complete search history.

(56) References Cited

U.S. PATENT DOCUMENTS

| 7,676,146 | B2* | 3/2010 | Border et al. .................... 396/80 |
| 8,780,251 | B2* | 7/2014 | Imai .......................... 348/333.02 |
| 2013/0050564 | A1* | 2/2013 | Adams et al. .................. 348/345 |

OTHER PUBLICATIONS

Haeberli, Paul, A Multifocus Method for Controlling Depth of Field, http://www.graficaobscura.com/depth/index.html.*

* cited by examiner

*Primary Examiner* — Tuan Ho
(74) *Attorney, Agent, or Firm* — Peter Su; Dentons US LLP

(57) ABSTRACT

The present application provides a method and device for acquiring an image, the method including determining at least a first focus and a second focus in an image acquisition area; acquiring first image information in the image acquisition area corresponding to the first focus; acquiring second image information in the image acquisition area corresponding to the second focus; and processing the first image information and the second image information to obtain third image information, so as to solve the technical problem in the prior art when a photo is taken by means of determining a single focus or multiple focuses, focuses in different planes cannot be determined, such that a mobile phone can merely process images in a single way and fails to record images corresponding to multiple focuses simultaneously, resulting in the processing capability of an electronic apparatus not being effectively improved.

9 Claims, 2 Drawing Sheets

METHOD AND DEVICE FOR ACQUIRING IMAGE

CROSS REFERENCE TO RELATED APPLICATIONS

This application claims the benefit under 35 U.S.C. §119(a) of Chinese Patent Application No. 201210425212.5 filed on Oct. 30, 2012, the entire disclosure of which is incorporated by reference herein in its entirety.

TECHNICAL FIELD

The present application relates generally to the field of electronic technology, and more particularly, to a method and device for acquiring an image.

BACKGROUND

Along with the development and progress of electronic technology, electronic apparatuses have been greatly improved in functions and information processing capabilities, for example, mobile phones in the prior art, which are now integrated therein functions of music player, video player, camera, and so on. Especially the function that a camera gives users is of great convenience, for example, the users can take photos anytime and anywhere, and they can achieve continuous shooting and panorama shooting, etc., so that they can take photos from many angles and in many directions.

However, when carrying out the present application, the inventor finds the following problems or defects in the prior art:

In the prior art, a mobile phone takes a photo by means of determining a single focus or multiple focuses. However, the focus(es) for acquisition can only be in the same plane of acquisition, and the focuses in different planes cannot be determined. For example, an image acquisition device in the prior art can only determine a close focus position or a distant focus position, but it cannot determine the close focus position and the distant focus position at the same time, so that the electronic apparatus cannot present in one photo clear images of the two close and distant focuses. Accordingly, the mobile phone can merely process images in a single way and fails to record images corresponding to multiple focuses simultaneously, resulting in the technical problem of the processing capability of the electronic apparatus not being effectively improved.

SUMMARY

The present application provides a method and device for acquiring an image in overcoming foregoing problems when a photo is taken by means of determining a single focus or multiple focuses, the focus(es) for acquisition can only be in the same plane, and the focuses in different planes cannot be determined, such that a mobile phone can merely process images in a single way and fails to record images corresponding to multiple focuses simultaneously, resulting in the processing capability of the electronic apparatus not being effectively improved, with the detailed technical solution as follows:

A method for acquiring an image, for use in an electronic apparatus including at least one image acquisition unit, the method comprising determining at least a first focus and a second focus in an image acquisition area; acquiring first image information in the image acquisition area corresponding to the first focus; acquiring second image information in the image acquisition area corresponding to the second focus; processing the first image information and the second image information to obtain third image information.

Optionally, the determining at least a first focus and a second focus in an image acquisition area includes determining a first focus in the image acquisition area according to a first operation; determining a second focus in the image acquisition area according to a second operation, after the first focus is determined.

Optionally, when the first image information and the second image information are acquired by one and the same image acquisition unit, the processing the first image information and the second image information to obtain third image information specifically includes parsing the first image information and the second image information, to determine same image information between the first image information and the second image information; superimposing the same image information, and splicing the first image information and the second image information to obtain the third image information.

Optionally, the superimposing the same image information, and splicing the first image information and the second image information to obtain the third image information specifically includes identifying a first image area corresponding to the first focus in the first image information; identifying a second image area corresponding to the second focus in the second image information; taking the first image area and the second image area as a main display area, and splicing the first image information and the second image information to obtain the third image information.

Optionally, when the first image information and the second image information are acquired by two image acquisition units, the obtaining third image information specifically includes obtaining first identification information in the first image information; obtaining second identification information in the second image information; obtaining a first image corresponding to the first identification information and a second focus image corresponding to the second identification information in accordance with the first identification information and the second identification information; adding the second focus image to the first image to obtain the third image information.

Optionally, before determining at least the first focus and the second focus in the image acquisition area, the method further includes obtaining a second operation of a user; determining to obtain image information by one image acquisition unit or two image acquisition units in response to the second operation.

A device for acquiring an image, the device comprising first determining unit for determining at least a first focus and a second focus in an image acquisition area; first image acquisition unit for acquiring first image information in the image acquisition area corresponding to the first focus; second image acquisition unit for acquiring second image information in the image acquisition area corresponding to the second focus; processing unit for processing the first image information and the second image information to obtain third image information.

Optionally, the processing unit includes parsing module for parsing the first image information and the second image information, and determine same image information between the first image information and the second image information; processing module for superimposing the same image information, and splicing the first image information and the second image information to obtain the third image information.

Optionally, the first image acquisition unit and the second image acquisition unit are one and the same image acquisition unit or different image acquisition units.

Optionally, the device further includes operation obtaining unit for obtaining a second operation of a user; second determining unit for determining to acquire image information by one image acquisition unit or two image acquisition units in response to the second operation.

An electronic apparatus according to an embodiment of the present application can select a multi-focus shooting mode, determine thereon multiple focus positions to acquire images, and then determine images to be acquired, according to the focus positions. Thus, it solves the technical problem in the prior art when an electronic apparatus takes a photo by means of determining a singe focus and cannot determine multiple focuses according to a user's operations, so that the mobile phone can merely process images in a single way and fails to record images corresponding to multiple focuses simultaneously, resulting in the processing capability of the electronic apparatus not being effectively improved; and it further achieves multi-focus shooting of the electronic apparatus and can precisely process multiple images to obtain a clear image containing multiple focuses, thereby improving the image acquisition function of the electronic apparatus and the user's experience.

An electronic apparatus, according to the embodiment of the present application, can select a multi-focus shooting mode, determine thereon multiple focus positions to acquire images, and then determine images to be acquired according to the focus positions. Thus, it solves the technical problem in the prior art, during shooting, in which a mobile phone can only locate one focus and determine the position of the whole picture according to the focus position, such a single-focus shooting will cause accuracy of the mobile phone acquired image not high, thereby reducing the mobile phone's processing on image information, increasing the mobile phone's image acquisition modes, and improving the image processing function of the mobile phone and the user's experience.

DETAILED DESCRIPTION

The present application provides a method and device for acquiring an image, the method including determining at least a first focus and a second focus in an image acquisition area, then acquiring first image information in the image acquisition area corresponding to the first focus, acquiring second image information in the image acquisition area corresponding to the second focus, and finally processing the first image information and the second image information to obtain third image information, so as to solve the technical problem in the prior art when a photo is taken by means of determining a single focus or multiple focuses, the focus(es) for acquisition can only be in the same plane of acquisition, and focuses in different planes cannot be determined. For example, an image acquisition unit in the prior art can only determine a close focus position or a distant focus position, but cannot determine the close focus position and the distant focus position at the same time, such that a mobile phone can merely process images in a single way and fails to record images corresponding to multiple focuses simultaneously, resulting in the processing capability of the electronic apparatus not being effectively improved.

Hereinafter, the technical solution of the present application shall be specifically described in conjunction with the drawings and detailed embodiments. It should be understood that the embodiments of the present application are only to specifically describe the technical solution of the present application, but are not to specifically define the present application, in the case of no conflict, the embodiments of the present application and the technical features in the embodiments can be combined with each other.

Figure 1:
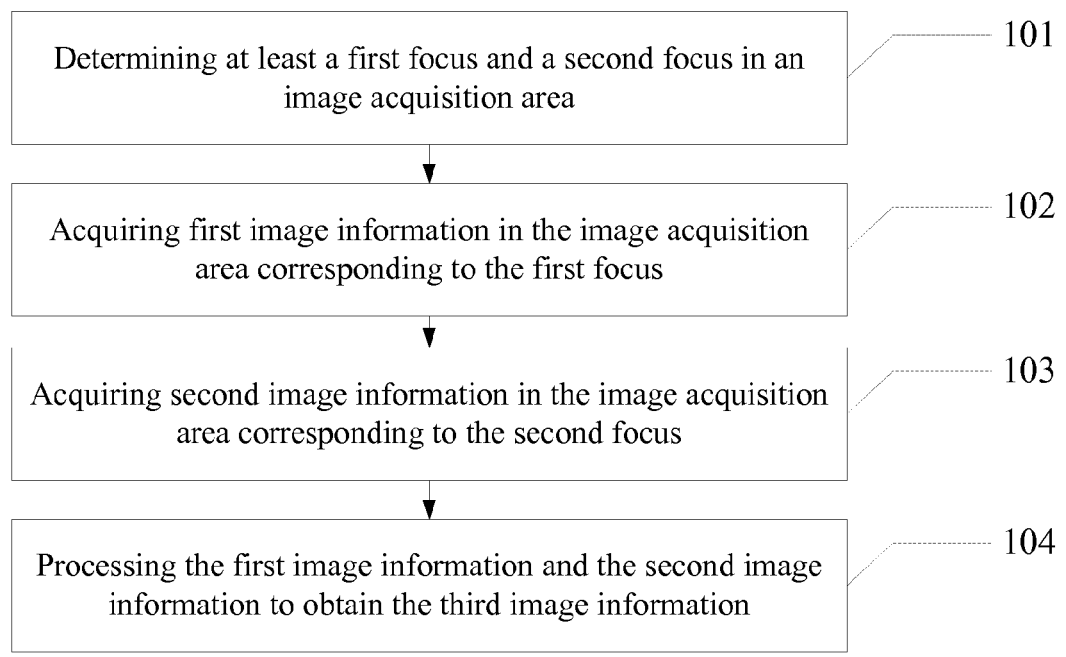
FIG. 1 is a flow chart of a method for acquiring an image according to an embodiment of the present application.

As shown in FIG. 1, a flow chart of a method for acquiring an image according to an embodiment of the present application is depicted, the method comprising:

Step 101: determining at least a first focus and a second focus in an image acquisition area.

First, the electronic apparatus in the present application is provided with at least one image acquisition unit, which acquires image information in respective areas; when the electronic apparatus enables a shooting function, a focus selection mode will be displayed on a display unit or a preset region of the electronic apparatus, that is to say, when the electronic apparatus enables the shooting function, the display unit of the electronic apparatus will display a selection interface, on which the user may select a single-focus mode or a multi-focus mode to take photos; when the user selects the single-focus mode, the electronic apparatus will take photos in a normal mode.

When the user selects the multi-focus mode, the electronic apparatus will display image area acquired by an image acquisition unit, where the user can select corresponding focus positions on the electronic apparatus by pressing keys or a touch operation; after the user selects one focus, the focus position will not change, in other words, after the user selects the focus position, the focus will serve as a focus position when shooting, then the user can select a second focus position in the image acquisition area. After detecting the user's operation, the electronic apparatus will determine a corresponding focus position. Of course, the user can undo the originally located focus position according to the selection, and re-select a corresponding focus position.

The cases that the mobile phone adopts said modes are as follows.

When the user opens the shooting function of the mobile phone, its display unit will display an operation interface, which displays whether the user selects a normal mode or a multi-focus mode to take photos. If the user selects to take photos in the normal mode through a touch operation on the touch control display unit of the electronic apparatus, the mobile phone will enable the normal mode to take photos. During the shooting process, the user can select one focus to take photos to obtain the image information in the corresponding area.

If the user selects to take photos in the multi-focus mode, the mobile phone also enters the shooting mode, but the touch control display unit of the mobile phone will display a prompt message for prompting the user to select multiple focuses, so that the user can perform multiple operations on the touch control display unit to determine a plurality of focus positions to be taken. The embodiments of the present application are illustrated by taking two focuses as example, after the user performs a first touch operation on the touch control display unit, the mobile phone will determine one focus position, and then the mobile phone will save the focus position, and prompt the user to perform a selection of a second focus. When the user selects a focus through a second operation, the mobile phone determines a second focus position and saves the second focus position at the same time. Of course, when the user determines that only the first focus position and the second focus position are required, the user needs to perform a determining operation on the touch control display unit. Of course, the "camera" key or the user's touch operation on the touch control display unit can perform this determining operation.

It should be noted that in the embodiments of the present application, the electronic apparatus can also locate focus positions on different planes of acquisition. That is to say, when the user uses the electronic apparatus to take photos, the image acquisition unit in the electronic apparatus can locate the focuses on different planes for image acquisition.

For example, if the user uses the camera function of the mobile phone, and the user selects multi-focus shooting, the touch control display unit in the mobile phone will display images acquired by an image acquisition unit. At this time, the acquired images contain a close view and distant view. For example, the close view displayed in the image is a window, and the distant view is buildings in the distance. When the user employs the multi-focus shooting, the user may locate a focus position on the window in the close view, and then the first focus position will be fixed on the window. After the first focus position is determined, the user can select a focus position on the buildings in the distant view, so that different focus positions in different planes can be determined through the user's operations, and photos are taken according to different focus positions. Therefore, it solves the technical problem in the prior art that the focuses for acquisition can only be in the same plane and focuses in different planes cannot be determined.

After the first focus position and the second focus position are determined, the electronic apparatus will perform step 102.

Step 102: acquiring first image information in the image acquisition area corresponding to the first focus;

Step 103: acquiring second image information in the image acquisition area corresponding to the second focus;

At step 101, according to the user's operation, the electronic apparatus determines a first focus and a second focus in the image acquisition area. When the user needs to acquire image information in a corresponding area, the electronic apparatus firstly determines a first focus position according to the first focus to acquire an image corresponding to the first focus based on the first focus position to obtain first image information. After obtaining the first image information, the electronic apparatus saves the first image information and initiates acquisition of second image information at the same time.

Specifically, while saving the first image information, the electronic apparatus acquires an image according to the second focus and obtains the second image information, and at the same time, it saves the first image information and the second image information at the same position.

As for a mobile phone, for example, when the user takes photos with the mobile phone, the image acquisition unit in the mobile phone first takes a photo, according to the first focus as specified by the user, to obtain image information containing the first focus. Specifically, when shooting, due to the limitation of characteristics of the camera, the user needs to select a focus and an image corresponding to the position of the focus in a clear image, and the image outside the focus is a blurred image, especially when taking photos with a large aperture. Therefore, in the embodiment of the present application, the mobile phone will first acquire an image corresponding to the first focus, and take the image, and at the same time save it in the memory. In the meantime, the mobile phone will acquire second image information according to the second focus selected by the user. In other words, the mobile phone will determine the area to be clearly displayed and the area to be blurred in the acquired image according to the second focus, and it will save the second image information in the corresponding cache position.

Of course, the above embodiment is to describe the image acquisition mode when the electronic apparatus is only provided with one image acquisition unit.

In the embodiment of the present application, the electronic apparatus may also be provided with two image acquisition units. That is to say, the electronic apparatus has two separate image acquisition units, i.e., a first image acquisition unit and a second image acquisition unit. In such case, when the electronic apparatus receives an operation of determining a first focus, it will determine the first focus and initiate the first image acquisition unit in the electronic apparatus, so that the first image acquisition unit acquires first image information containing the first focus, according to the first focus. While obtaining the first image information, the electronic apparatus will initiate the second image acquisition unit, and then the second image acquisition unit will obtain second image information containing the second focus, according to the second focus. Thereafter, the electronic apparatus saves the first image information and the second image information in a preset position.

For example, the mobile phone is provided with a first image acquisition unit and a second image acquisition unit. Of course, these two image acquisition units here are arranged in one camera. After the user determines a first focus and a second focus on the touch control display unit of the mobile phone through touch operations, the mobile phone will initiate the first image acquisition unit and the second image acquisition unit simultaneously. Hence, the two image acquisition units operate at the same time; the first image acquisition unit acquires first image information containing the first focus according to the first focus, and the second image acquisition unit will obtain second image information containing the second focus according to the second focus.

For example, the user takes photos of two stone lions at the gate with a mobile phone, and needs to acquire clear image of the two stone lions at the same time. Since the left stone lion and the right stone lion are separated by a relatively large distance, if photos are taken with a current mobile phone, the mobile phone cannot display two clear stone lions in one image. The mobile phone in the embodiment of the present application can enable a multi-focus shooting mode for image acquisition. After the user initiates this function, the user can select on the touch control display unit the first focus position on the left stone lion and the second focus position on the right stone lion. Next, the mobile phone will initiate the first image acquisition unit to acquire a clear image of the left stone lion, and it will save the image in a corresponding position. Meanwhile, the second image acquisition unit in the mobile phone will acquire a clear image of the right stone lion, and it will save this image in a corresponding position.

In addition, except the process of determining two focuses in the same plane, the mobile phone in the embodiment of the present application can also determine two focuses in different planes. For example, when the user takes photos of sceneries outside the window with a mobile phone, the mobile phone may select the window as the position of the first focus, and the buildings outside the window as the position of the second focus. The mobile phone will use the first image acquisition unit and the second image acquisition unit to obtain the first image information and the second image information according to the positions of the first focus and the second focus, and save the image information in corresponding positions.

It should be noted that the user, through a select operation, determines whether the electronic apparatus obtains image information by one image acquisition unit or two image acquisition units.

After the electronic apparatus acquires the first image information and the second image information, the electronic apparatus performs step 104.

Step 104: processing the first image information and the second image information to obtain third image information.

After obtaining the first image information and the second image information at steps 102 and 103, the electronic apparatus will not display the first image information and the second image information immediately. Since the first image information and the second image information are image information acquired in the multi-focus mode, the electronic apparatus will parse the first image information and the second image information, and then determine the same areas and different areas between the first image information and the second image information. After determining the same areas and different areas, the electronic apparatus generates a third image, during which the electronic apparatus will first perform a superimposing process on the first image information and the second image information. During the superimposing process, the electronic apparatus will process the same areas into a single image area, and then highlight the different areas on the image. In other words, when the third image is generated, the image area corresponding to the first focus and the image area corresponding to the second focus will be highlighted on the third image, so that the image areas corresponding to the first focus and the second focus will be displayed as clear images.

For example, when the user acquires first image containing the first focus and second image containing the second focus by using a mobile phone, the mobile phone will determine image area corresponding to the first focus and image area corresponding to the second focus, so that the mobile phone splices the first image and the second image. During the splicing process, the mobile phone will first splice the same images between the first image and the second image to generate a complete image. Since the first image includes not only image area corresponding to the first focus but also image area corresponding to the second focus, when generating the superimposed image, the image area corresponding to the first focus and the image area corresponding to the second focus are clearly displayed areas. For example, after the user determines images of the left stone lion and the right stone lion, the mobile phone will determine position of the left stone lion as a focus position and position of the right stone lion as a focus position, and the remaining area are the same areas. Afterwards, the mobile phone performs splicing process on the two images, and the same areas will server as a same area after splicing, but the image of the left stone lion and the image of the right stone lion will serve as clearly displayed images in the new image.

Accordingly, with the above embodiment, the electronic apparatus can select a multi-focus shooting mode, determine thereon multiple focus positions for acquiring images, and then determine the images to be acquired according to the focus positions. Therefore, it solves the technical problem in the prior art, in which the electronic apparatus takes a photo by means of determining one singe focus and cannot determine multiple focuses according to a user's operations, so that a mobile phone merely processes images in a single way and fails to record images corresponding to multiple focuses simultaneously resulting in the processing of the electronic apparatus not being effectively improved. It further achieves multi-focus shooting of the electronic apparatus and can precisely process multiple images to obtain a clear image containing multiple focuses, thereby improving the image acquisition function of the electronic apparatus and the user's experience.

In addition, the present application further comprises one embodiment. In this embodiment, when the electronic apparatus obtains a first image and a second image. After determining a first focus, the first image acquisition unit will acquire the first image. After the user determines a second focus on the electronic apparatus, since the images acquired by the two-image acquisition units are within one area, the electronic apparatus will initiate the second image acquisition unit and will determine a second focus in the first image to determine the image to be clearly displayed from the first image information. In other words, after the acquisition of the first image is complete, the electronic apparatus merely needs to determine the second focus position, in order to generate image information containing the first focus and the second focus.

That is to say, the electronic apparatus will obtain a first identification in the first image information, obtain a second identification in the second image information, and acquire a first image corresponding to the first identification and a second focus image corresponding to the second identification information, according to the first identification and the second identification, and then add the second focus image to the first image to obtain the third image information.

For example, when a mobile phone is used for taking photos of two stone lions, the user can first determine a first focus on the left stone line, so as to acquire a first image containing the image of the left stone lion, and at the same time obtains a second focus position determined by the user on the mobile phone, the second focus position is on the right lion stone. The mobile phone will not obtain a complete second image any more, and it only obtains the area corresponding to the second focus so that the image in the area corresponding to the second focus, i.e., the clear image of the right stone lion is added to the first image. As a result, the first image contains images of the left stone lion and the right stone lion. Such a way reduces the mobile phone's processing of image information, increases the mobile phone's image acquisition modes, and improves the image processing function of the mobile phone and the user's experience.

Figure 2:
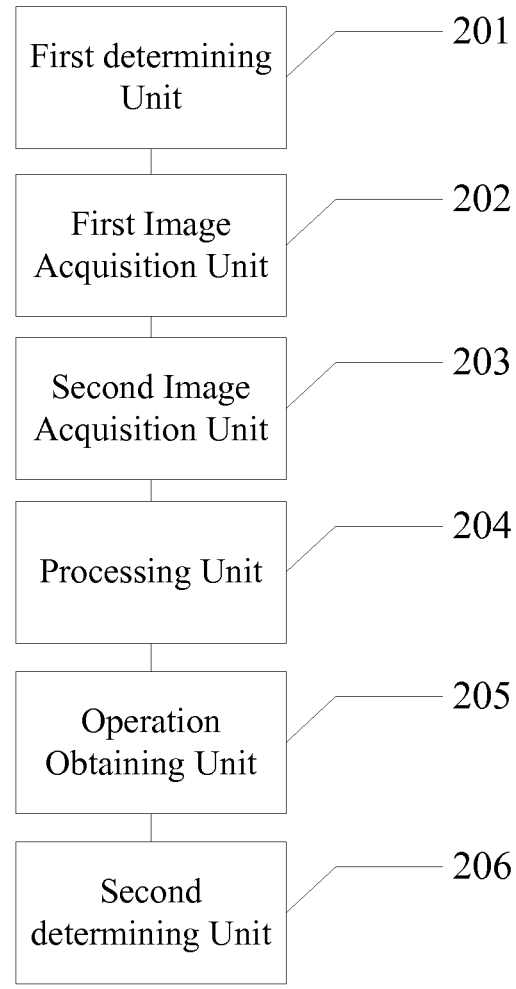
FIG. 2 is a specific structural schematic diagram of a device for acquiring an image according to an embodiment of the present application.

Corresponding to a method for acquiring image information in the embodiment of the present application, there is further provided a device for acquiring image information. As shown FIG. 2, a specific structural schematic diagram of a device for acquiring an image according to an embodiment of the present application is depicted, the device comprising first determining unit 201 for determining at least a first focus and a second focus in an image acquisition area; first image acquisition unit 202 for acquiring first image information in the image acquisition area corresponding to the first focus; second image acquisition unit 203 for acquiring second image information in the image acquisition area corresponding to the second focus; processing unit 204 for processing the first image information and the second image information to obtain third image information; operation obtaining unit 205 for obtaining a second operation; second determining unit 206 for determining whether to acquire image information using one image acquisition unit or two image acquisition units in response to the second operation.

Wherein, the first image acquisition unit 202 and the second image acquisition unit 203 are the same acquisition unit or different acquisition units, in other words, number of the image acquisition unit may be one or more than one.

Figure 3:
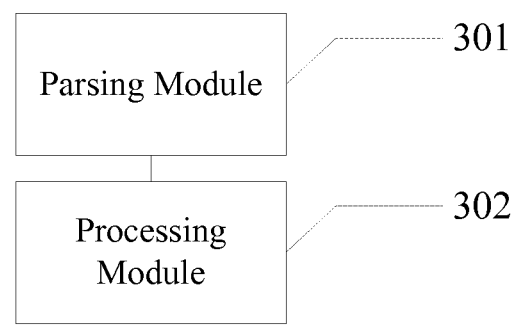
FIG. 3 is a specific structural schematic diagram of a processing unit 204 according to the embodiment of the present application.

Moreover, the processing unit 204 in the device specifically includes a corresponding processing module. As shown in FIG. 3, a specific structural schematic diagram of the processing unit, according to an embodiment of the present application, is depicted, and the processing unit 204 includes parsing module 301 for parsing the first image information and the second image information, to determine the same image information between the first image information and the second image information; processing module 302 for superimposing the same image information, and splicing the first image information and the second image information to obtain the third image information.

One or more embodiments provided in the present application at least have technical effects or advantages as follows.

An electronic apparatus according to the embodiment of the present application can select a multi-focus shooting mode, determine thereon multiple focus positions to acquire images, and then determine images to be acquired according to the focus positions. Thus, it solves the technical problem in the prior art where an electronic apparatus takes a photo by means of determining a singe focus and cannot determine multiple focuses according to a user's operations, so that a mobile phone merely processes images in a single way and fails to record images corresponding to multiple focuses simultaneously, resulting in the processing of the electronic apparatus not being effectively improved. It further achieves multi-focus shooting of the electronic apparatus, and can precisely process multiple images to obtain a clear image containing multiple focuses, thereby the image acquisition function of the electronic apparatus and the user's experience are improved.

An electronic apparatus according to the embodiment of the present application can select a multi-focus shooting mode, determine thereon multiple focus positions to acquire images, and then determine images to be acquired according to the focus positions. Thus, it solves the technical problem in the prior art that, during shooting, a mobile phone can only locate one focus and determine the position of the whole picture according to the focus position, however, such a single-focus shooting will result in that the mobile phone can merely process images in a single way and fails to record images corresponding to multiple focuses simultaneously, causing the processing capability of the electronic apparatus not being effectively improved. Accordingly, it reduces the mobile phone's processing of image information, increases the mobile phone's image acquisition modes, and improves the image processing function of the mobile phone and the user's experience.

One person skilled in the art should understand that the embodiments of the present application may be provided as a method, a system, or a computer program product. Accordingly, the present application can be implemented by a hardware embodiment, a software embodiment, or a combination of software and hardware embodiments. In addition, the present application can be embodied as a computer program product that is implemented on one or more computer-usable storage media (including, but not limited to, magnetic disc memory, CD-ROM, optical memory, etc.) recording computer-usable program codes thereon.

The present application is described with reference to flowcharts and/or block diagrams of the method, apparatus (system), and computer program product according to the embodiments of the present application. It should be understood that computer program instructions can implement each process step and/or block in the flowchart and/or block diagram, and a combination of process steps/blocks in the flowchart and/or block diagram. These computer program instructions can be provided in a processor of a general-purpose computer, a special-purpose computer, an embedded processor, or other programmable data processing apparatus to form a machine, such that the instructions which executed by a processor of the computer or other programmable data processing apparatus form a device to perform function(s) specified in one or more process steps in the flowchart and/or in one or more blocks in the block diagram.

These computer program instructions can also be stored in a computer readable memory that can boot a computer or other programmable data processing apparatus to work in a specific manner, so that the instructions stored in the computer readable memory can produce manufactured goods including an instructing device, which performs the function (s) as specified in one or more process steps in the flowchart and/or in one or more blocks in the block diagram.

The computer program instructions may also be loaded onto a computer or other programmable data processing apparatus, so that a series of process steps are performed on the computer or other programmable data processing apparatus to generate a computer-implemented process, such that the instructions which are executed on the computer or other programmable data processing apparatus provide steps for performing the function(s) as specified in one or more process steps in the flowchart and/or in one or more blocks in the block diagram.

Although the preferred embodiments of the present application have been described, one skilled in the art can make other variations and modifications to these embodiments once he learns the basic inventive concept. Therefore, the appended claims are intended to be interpreted as including the preferred embodiments and all the variations and modifications within the scope of the present application.

It is evident that one skilled in the art can modify and vary the present application in many ways without departing from the spirit and scope of the present application. If these modifications and variations fall within the scope of the claims of the present application and equivalents thereof, then the present application also intends to contain these modifications and variations.

What is claimed is:

1. A method for acquiring an image, for use in an electronic apparatus including one image acquisition unit, wherein, the method comprises:
    determining at least a first focus and a second focus in an image acquisition area;
    acquiring first image information in the image acquisition area corresponding to the first focus;
    acquiring second image information in the image acquisition area corresponding to the second focus;
    processing the first image information and the second image information to obtain third image information,
    wherein the first image information and the second image information are acquired by the one image acquisition unit, and
    the determining at least a first focus and a second focus in an image acquisition area includes:
        providing a focus selection mode including a single-focus mode or a multi-focus mode;

when the multi-focus mode is selected, determining and recording position of the first focus based on a first operation on a input device of the electronic apparatus;

after determining and recording position of the first focus, determining and recording position of the second focus based on a second operation on the input device of the electronic apparatus, the first focus and the second focus being on different planes for image acquisition.

2. The method according to claim 1, wherein, the determining at least the first focus and the second focus in the image acquisition area includes:

determining the first focus in the image acquisition area according to a first operation; and determining the second focus in the image acquisition area according to a second operation, after the first focus is determined.

3. The method according to claim 1, wherein, before the determining of at least the first focus and the second focus in the image acquisition area, the method further includes:

obtaining a second operation of a user;

determining whether to obtain image information by the one image acquisition unit in response to the second operation.

4. The method according to claim 2, wherein, before the determining of at least the first focus and the second focus in the image acquisition area, the method further includes:

obtaining a second operation of a user;

determining whether to obtain image information by the one image acquisition unit in response to the second operation.

5. A device for acquiring an image, wherein, the device comprises:

touch control display unit;

first determining unit for determining at least a first focus and a second focus in an image acquisition area;

one image acquisition unit for acquiring first image information in the image acquisition area corresponding to the first focus, and acquiring second image information in the image acquisition area corresponding to the second focus;

processing unit for processing the first image information and the second image information to obtain third image information, wherein, first determining unit cause the touch control display unit to display a focus selection mode including a single-focus mode or a multi-focus mode, determines and records position of the first focus based on a first operation on a input device of the electronic apparatus when the multi-focus mode is selected, determines and records position of the second focus based on a second operation on the input device of the electronic apparatus after the position of the first focus is recorded, the first focus and the second focus being on different planes for image acquisition.

6. The device according to claim 5, wherein, the device further includes:

operation obtaining unit for obtaining a second operation;

second determining unit for determining whether to acquire image information by the one image acquisition unit in response to the second operation.

7. The method according to claim 1, wherein, when the first image information and the second image information are acquired by one image acquisition unit, the processing the first image information and the second image information to obtain third image information includes:

parsing the first image information and the second image information to determine same image information between the first image information and the second image information;

superimposing the same image information and splicing the first image information and the second image information to obtain the third image information.

8. The method according to claim 7, wherein, the superimposing the same image information and splicing the first image information and the second image information to obtain the third image information includes:

identifying a first image area corresponding to the first focus in the first image information;

identifying a second image area corresponding to the second focus in second image information;

taking the first image area and the second image area as main display areas, and splicing the first image information and the second image information to obtain the third image information.

9. The device according to claim 5, wherein, the processing unit includes:

a parsing module for parsing the first image information and the second image information, to determine same image information between the first image information and the second image information;

a processing module for identifying a first image area corresponding to the first focus in the first image information, identifying a second image area corresponding to the second focus in the second image information, taking the first image area and the second image area as main display areas, and splicing the first image information and the second image information to obtain the third image information.

* * * * *